United States Patent

Ito

[11] Patent Number: 6,115,554
[45] Date of Patent: Sep. 5, 2000

[54] DISTANCE MEASURING DEVICE FOR CAMERA

[76] Inventor: Akira Ito, c/o Seiko Precision Inc. 934-13, Shikawatashi, Yotsukaido-shi Chiba-ken, Japan

[21] Appl. No.: 09/163,867

[22] Filed: Sep. 30, 1998

[30] Foreign Application Priority Data

Sep. 30, 1997 [JP] Japan ................................. 9-266038

[51] Int. Cl.⁷ .............................................. G03B 13/00
[52] U.S. Cl. ........................................ 396/106; 396/109
[58] Field of Search ................................ 396/106, 109

[56] References Cited

U.S. PATENT DOCUMENTS

| | | | |
|---|---|---|---|
| 4,288,152 | 9/1981 | Matsuda | 396/106 |
| 4,322,141 | 3/1982 | Tominaga et al. | 396/106 |
| 4,582,424 | 4/1986 | Kawabata | 396/109 |
| 5,191,384 | 3/1993 | Nakanishi et al. | 396/109 |
| 5,245,398 | 9/1993 | Ludden | 396/106 |
| 5,500,728 | 3/1996 | Nishimoto | 396/106 |
| 5,550,628 | 8/1996 | Kawabata | 396/106 |
| 5,862,418 | 1/1999 | Ito | 396/106 |
| 5,963,309 | 10/1999 | Nakanishi et al. | 396/106 |

*Primary Examiner*—Russell Adams
*Attorney, Agent, or Firm*—Adams & Wilks

[57] ABSTRACT

To provide a distance measuring device for a camera using divided photocells which is resistant to beam deficiency, the device includes one or more light emitting elements for emitting measuring light to an object to be photographed, a plurality of photocells for measuring light reflected by the object, an adding circuit for adding outputs of an arbitrary continuous plurality of photocells, an integrating circuit for integrating an output of the amplifying circuit, and a CPU for calculating a distance to the object based on an output from the integrating circuit. The CPU determines a combination of one of the light emitting elements and a first photocell group at which a result of the addition is maximized, sets a second photocell group comprising the first photocell group and a single one or a plurality of the photocells contiguous to the first photocell group from the determined light emitting element and the determined first photocell group, divides the second photocell group into a plurality of subgroups and measures the distance to the object based on outputs from the respective divided subgroups.

36 Claims, 14 Drawing Sheets

| CN | CELL | GN | $V_{int}$ | Ne | CN | CELL | GN | $V_{int}$ | Ne | CN | CELL | GN | $V_{int}$ | Ne |
|---|---|---|---|---|---|---|---|---|---|---|---|---|---|---|
| 1 | 2+3 | 0 | 1 | 10 | 1 | 2+3 | 0 | 1 | 10 | 1 | 2+3 | 0 | 1 | 10 |
| 2 | 3+4 | 0 | 1 | 10 | 2 | 3+4 | 0 | 1 | 10 | 2 | 3+4 | 0 | 1 | 10 |
| 9 | 10+11 | 0 | 11 | 10 | 5 | 6+7 | 0 | 13 | 10 | 13 | 14+15 | 0 | 8 | 10 |
| 10 | 11+12 | 3 | 8 | 10 | 6 | 7+8 | 3 | 11 | 10 | 14 | 15+16 | 3 | 6 | 10 |
| 11 | 12+13 | 5 | 10 | 10 | 7 | 8+9 | 4 | 12 | 10 | 15 | 16+17 | 4 | 9 | 10 |
| 12 | 13+14 | 6 | 18 | 8 | 8 | 9+10 | 5 | 14 | 10 | 16 | 17+18 | 4 | 3 | 10 |
| 13 | 14+15 | 6 | 5 | 10 | 9 | 10+11 | 5 | 7 | 10 | 17 | 18+19 | 4 | 1 | 10 |
| 22 | 23+24 | 6 | 1 | 10 | 22 | 23+24 | 5 | 1 | 10 | 22 | 23+24 | 4 | 1 | 10 |
| 23 | 24+25 | 6 | 1 | 10 | 23 | 24+25 | 5 | 1 | 10 | 23 | 24+25 | 4 | 1 | 10 |

Fig 8

| X | D (m) | | | | | | | |
|---|---|---|---|---|---|---|---|---|
| CN | 0:2 | 1:3 | 2:4 | 3:5 | 4:6 | 5:7 | 6:8 | 7:9 |
| 0.00 | infinity flag | | | | | | | |
| 0.05 | 18.78 | 3.930 | 2.201 | 1.528 | 1.170 | 0.948 | 0.797 | 0.688 |
| 0.40 | 3.079 | 1.905 | 1.380 | 1.081 | 0.889 | 0.754 | 0.656 | 0.580 |
| 0.45 | 2.747 | 1.773 | 1.309 | 1.037 | 0.859 | 0.733 | 0.639 | 0.567 |
| 0.50 | 2.500 | 1.666 | 1.250 | 1.000 | 0.833 | 0.714 | 0.625 | 0.556 |
| 0.55 | 2.500 | 1.572 | 1.196 | 1.065 | 0.809 | 0.696 | 0.611 | 0.545 |
| 0.60 | 2.104 | 1.481 | 1.143 | 0.930 | 0.784 | 0.678 | 0.597 | 0.533 |
| 0.95 | 1.341 | 1.058 | 0.873 | 0.743 | 0.647 | 0.573 | 0.514 | 0.466 |
| 1.00 | close flag | | | | | | | |

DISTANCE MEASURING DEVICE FOR CAMERA

BACKGROUND OF THE INVENTION

1. Field of the Invention

The present invention relates to a distance measuring device for a camera.

2. Description of Related Art

The present applicant has proposed a distance measuring device having a row of a plurality of SPDs (silicon photodiodes), as disclosed by Japanese Patent Application No. 8-248116 (which is incorporated herein by reference). According to this device, in order to avoid the influence of scattered light, infrared light from a light emitting element reflected by an object is received by a row of SPDs and a distance to the object is calculated from a ratio of output currents of a coupled double-cell having the largest amount of received light.

However, applicant's previous distance measuring device has a problem in that there is no assurance that all of the light from the light emitting element is reflected by the object to be photographed. For example, when the object is a person and light from the light emitting element is incident on the shoulder of the person, a portion of light may pass over and to the rear side of the person's shoulder, thereby altering the optical gravitational center of the reflected light and causing the distance to be erroneously measured. Hereinafter, such a phenomenon will be referred to as "beam deficiency".

As a distance measuring device in which it is difficult to solve the "beam deficiency" problem, there has conventionally been known a distance measuring device for a camera of an active type using a plurality of light emitting elements (hereinafter, referred to as "multiple AF (Automatic Focusing)"). The device is pointed toward an object, measuring light such as infrared light or the like is emitted, reflected light from the object is received by photocells and a distance to the object is determined based on positions at which images of the respective light emitting elements are formed on the photocells and the intensity of the received light.

However, when the multiple AF is formed by simply increasing the number of light emitting elements, as disclosed in Japanese Patent Application No. 8-248116 (incorporated herein by reference), the sequence becomes excessively complicated and the shutter release time lag is greatly prolonged, which reduces photo opportunity.

SUMMARY OF THE INVENTION

In order to resolve the above-described problems, a distance measuring device according to the present invention is provided with a plurality of light emitting elements and a plurality of photocells, and makes the respective light emitting elements emit light prior to actual distance measurement and determines by which combination of a light emitting element and a photocell the actual distance measurement is to be carried out. The actual distance measurement is carried out by using a light emitting element and a photocell which have been previously determined and therefore, distance can be measured without the influence of beam deficiency.

Further, when pluralities of amplifying circuits and integrating circuits are installed, processing can be carried out in parallel in actual measurement and faster distance measurement can advantageously be performed.

According to one aspect of the present invention, there is provided a distance measuring device for a camera comprising a plurality of light emitting means for emitting measuring light to an object, light receiving means comprising a plurality of photocells for receiving measuring light reflected by the object, an adding circuit for adding outputs of an arbitrary continuous plurality of photocells among the plurality of photocells, an amplifying circuit for respectively amplifying an output of the adding circuit, an integrating circuit for respectively integrating an output of the amplifying circuit, and calculating means for calculating a distance to the object based on an output of the integrating circuit, wherein the calculating means includes means for determining a combination of the light emitting means and a first photocell group for maximizing a result of the addition, setting a second photocell group comprising the first photocell group and a single one or a plurality of the photocells contiguous to the first photocell group from the determined light emitting means and the determined first photocell group, dividing the second photocell group into a plurality of subgroups and measuring the distance to the object based on outputs from the respective divided subgroups.

According to another aspect of the present invention, there is provided a distance measuring device for a camera comprising a plurality of light emitting means for emitting measuring light to an object, light receiving means comprising a plurality of photocells for receiving measuring light reflected by the object, a plurality of adding circuits for performing an addition of outputs of arbitrary continuous pluralities of photocells among the plurality of photocells, a plurality of amplifying circuits for respectively amplifying outputs of the plurality of adding circuits, a plurality of integrating circuits for respectively integrating outputs of the plurality of amplifying circuits, and calculating means for calculating a distance to the object from outputs of the plurality of integrating circuits, wherein the calculating means includes means for determining a combination of the light emitting means and a first photocell group for maximizing a result of the addition, setting a second photocell group comprising the first photocell group and a single one or a plurality of the photocells contiguous to the first photocell group from the determined light emitting means and the determined first photocell group, dividing the second photocell group into a plurality of subgroups and measuring the distance to the object based on outputs of the respective divided subgroups.

BRIEF DESCRIPTION OF THE DRAWINGS

FIG. 8 shows a table incorporated in ROM according to the first embodiment;

DETAILED DESCRIPTION OF THE PREFERRED EMBODIMENTS

Figure 1:
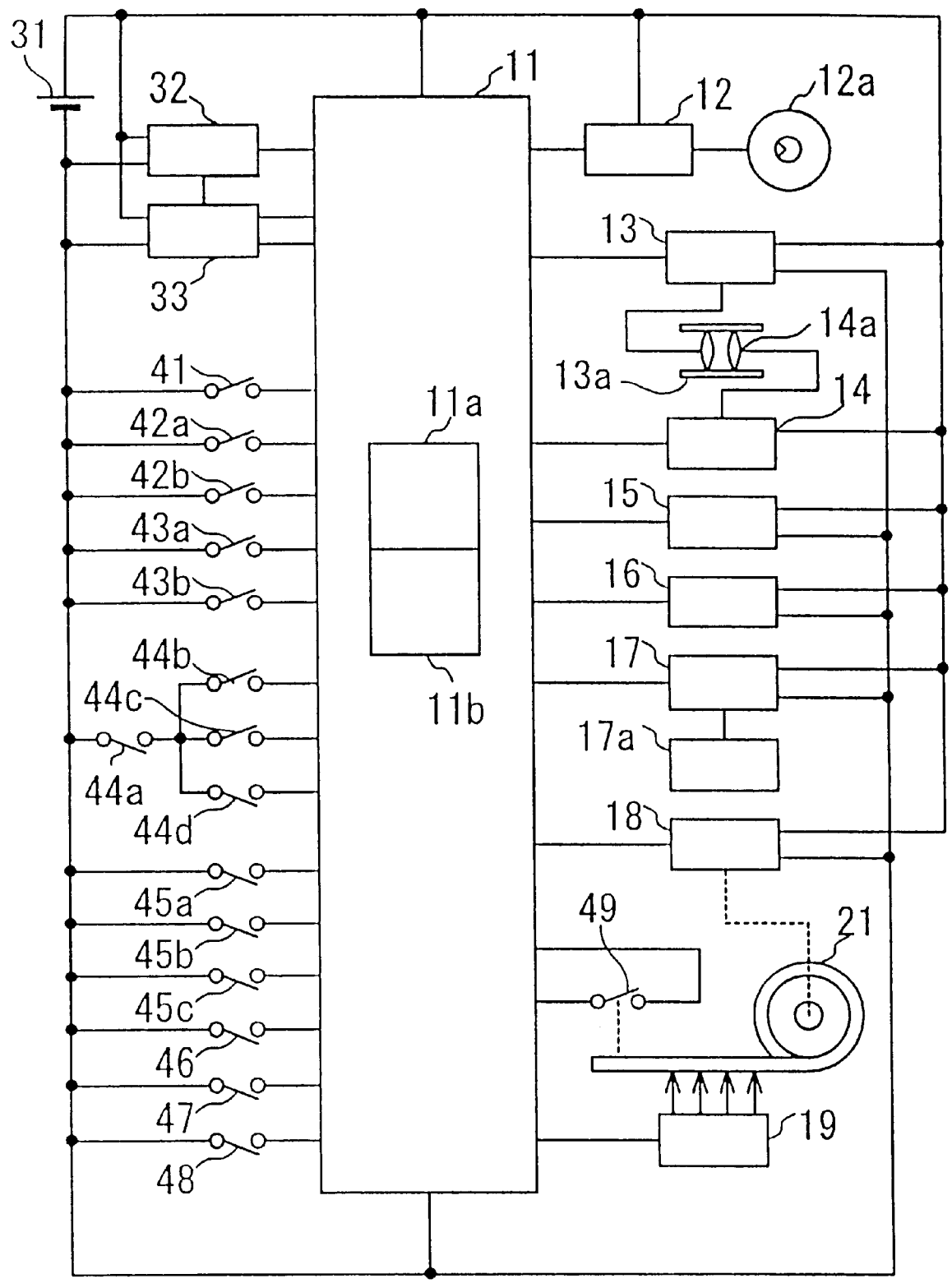
FIG. 1 is a block diagram of a camera using a distance measuring device according to a first embodiment of the present invention.

An explanation will now be given of preferred embodiments of the present invention with reference to the attached drawings. FIG. 1 is a block diagram showing the construction of a camera having a distance measuring device according to the first embodiment of the present invention. A CPU 11 incorporates a non-volatile read only memory (hereinafter referred to as a "ROM") 11a for governing and controlling a camera and holding control programs and fixed data used for operation of the camera, and a random access memory (hereinafter referred to as a "RAM") 11b used for calculation and temporary storage. As described below, the ROM 11a is used for pre-storage of fixed data shown by FIG. 8 and control programs including the subroutines shown by FIG. 9 through FIG. 14 and the RAM 11b is allocated at predetermined addresses with a region for storing or calculating numerical values or amounts such as numbers of times K1 and K2 determined by iterative processing, as described below, an offset voltage change rate Ofs, values N1, N2 and X, and control signals CN and GN, all of which are described below, and a region for storing flags such as an infinity flag Fi, a close flag Fc and the like.

A shutter driving circuit 12 performs an exposure operation by driving a shutter 12a under instruction of the CPU 11. When a zoom-tele driving switch 42b (described below) is activated, the CPU 11 drives a zoom lens 13a to a telescopic position by controlling a photographing lens driving circuit 13, and drives the zoom lens 13a to a wide angle position when a zoom-wide driving switch 42a is activated. In either of the switches, the zoom lens 13a is driven only during a time period when the switch is being activated and the zoom lens 13a is stopped at a point in time when the switch is not activated. The zoom ratio is changed in accordance with the movement of the zoom lens 13a and a diaphragm setting at a fully opened state of the zoom lens 13a is changed. Accordingly, the CPU 11 reads code patterns of zoom encoders 45a through 45c (described below) in conjunction with the movement of the zoom lens 13a, calculates a current zoom ratio and converts it to the diaphragm setting at a fully opened state Av of the lens in accordance with a table stored in the ROM 11a.

A focus lens driving circuit 14 moves a focus lens 14a to a position where an object is focused prior to exposure operation based on a signal from a distance measuring circuit 16, as described below.

A light measuring circuit 15 measures brightness of an object under instruction of the CPU 11 and outputs the result to the CPU 11. The CPU 11 calculates a measured light value Bv from the result in accordance with a table of measured light value stored in the ROM 11a. The distance measuring circuit 16 measures a distance to an object under instruction of the CPU 11 and outputs the result to the CPU 11. The CPU 11 calculates a distance D based on the result in accordance with a table of measured distance value stored in the ROM 11a. A liquid crystal driving circuit 17 controls a liquid crystal panel 17a based on a signal output by the CPU 11 to provide a display of selected operational settings.

Next, an explanation will be given of the respective switches. A main switch 41 is a pushbutton switch for enabling the operation of the camera and performs a toggling action where the camera is sequentially made operational or non-operational with the pushing thereof. Both the zoom-wide driving switch 42a and the zoom-tele driving switch 42b are pushbutton switches for driving the lens barrel 13a during a time period when the switches are being pushed, as mentioned above. A back lid switch 48 is a switch for detecting the opening and closing of a back lid of the camera. A half push switch 43a is turned ON at a time where a conventional release switch is pushed down by one-half of a stroke, that is, at an intermediary position thereof, and a full push switch 43b is turned ON at a time point where the release switch is pushed down fully. The full push switch 43b generates a release signal.

Film sensitivity reading switches 44a through 44d are switches for reading code patterns printed on a film case. The CPU 11 calculates a film sensitivity Sv from the read code patterns. The zoom encoders 45a through 45c convert patterns printed on a lens barrel where the zoom lens 13a is provided, into electric signals and output them to the CPU 11. This data is used for recognizing the position of the lens barrel. The CPU 11 calculates an optimum exposure value based on the conventional apex calculation method from the measured light value Bv, the detected film sensitivity Sv, and the diaphragm setting at a fully opened state Av and carries out exposure driving.

A mode switch 46 circulatingly sets a plurality of modes of a camera such as normal photography, macrophotography and self timer photography at each pushing down thereof.

A feed detecting switch 49 generates pulse-like signals for detecting perforations (frame feeding holes) of a moving film 21 when the film 21 is wound or rewound. When the back lid of the camera is closed under a state where the film 21 is loaded into the camera, the back lid switch 48 is turned OFF. When this state is detected, the CPU 11 operates a film feed driving circuit 18 and winds the film 21. A braking condition is given to the film feed driving circuit 18 at a time point where the number of pulses of the feed detecting switch 49 reaches a predetermined value, by which feeding of the film 21 is finished. Further, a winding condition is given to the film feed driving circuit 18 after finishing photographing operation and the braking condition is given thereto at a point in the when the number of pulses of the feed detecting switch 49 reaches the predetermined value by which winding of one frame is performed.

Further, a battery 31 is connected to the CPU 11, the shutter driving circuit 12, the photographing lens driving circuit 13, the focus lens driving circuit 14, the light measuring circuit 15, the distance measuring circuit 16, the liquid crystal driving circuit 17 and the film feed driving circuit 18 by which power source is supplied. The voltage of the battery 31 is boosted by a power source circuit 32 and boosted voltage is always monitored by a voltage detecting circuit 33. When the result of measurement by the voltage detecting means indicates a predetermined voltage Vlow or lower, a voltage detection signal LO is output to the CPU 11 and the CPU 11 prohibits operations of photographing, zoom driving, film feeding, stroboscopic lamp charging, and the like, applying a load on the power source as a camera. When the result of measurement by the voltage detecting means indicates a predetermined voltage Vres that is lower than the voltage Vlow, a reset signal RE is output to the CPU 11 whereby the CPU 11 is brought into a reset state and all operations cannot be performed. This operation is intended to prevent erroneous operation of the CPU 11 caused by lowering of the power source voltage. When the power source voltage is equal to or greater than the voltage Vres, start switches of the CPU 11 such as the main switch 41, the zoom-wide driving switch 42a, the zoom-tele driving switch 42b, the half push switch 43a, the back lid switch 48 and the like, are operational, and further, the CPU 11 starts operation and executes an initializing program pre-stored in the ROM 11a.

Figure 2:
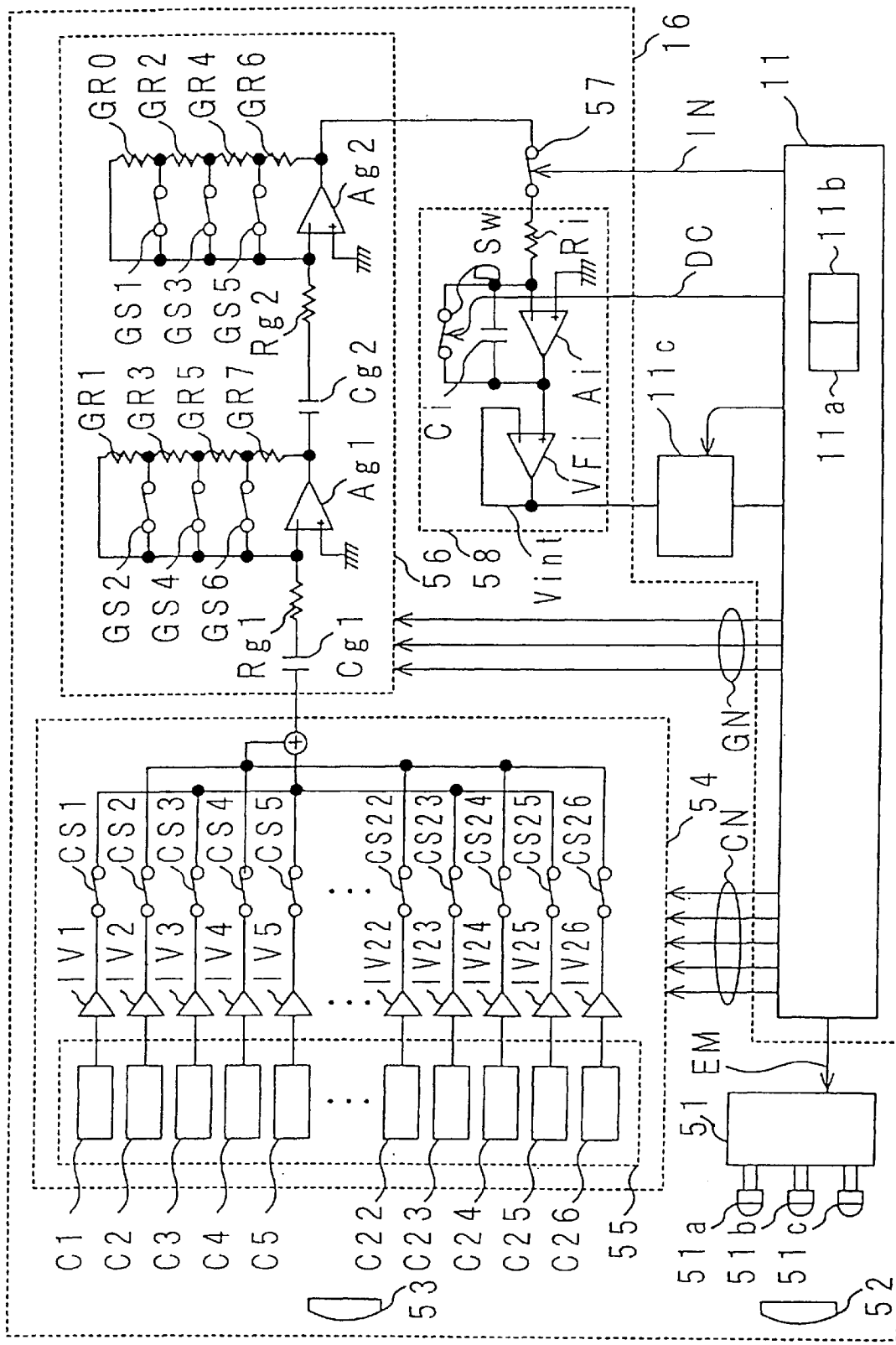
FIG. 2 is a circuit diagram of the distance measuring device of the first embodiment.
Figure 3:
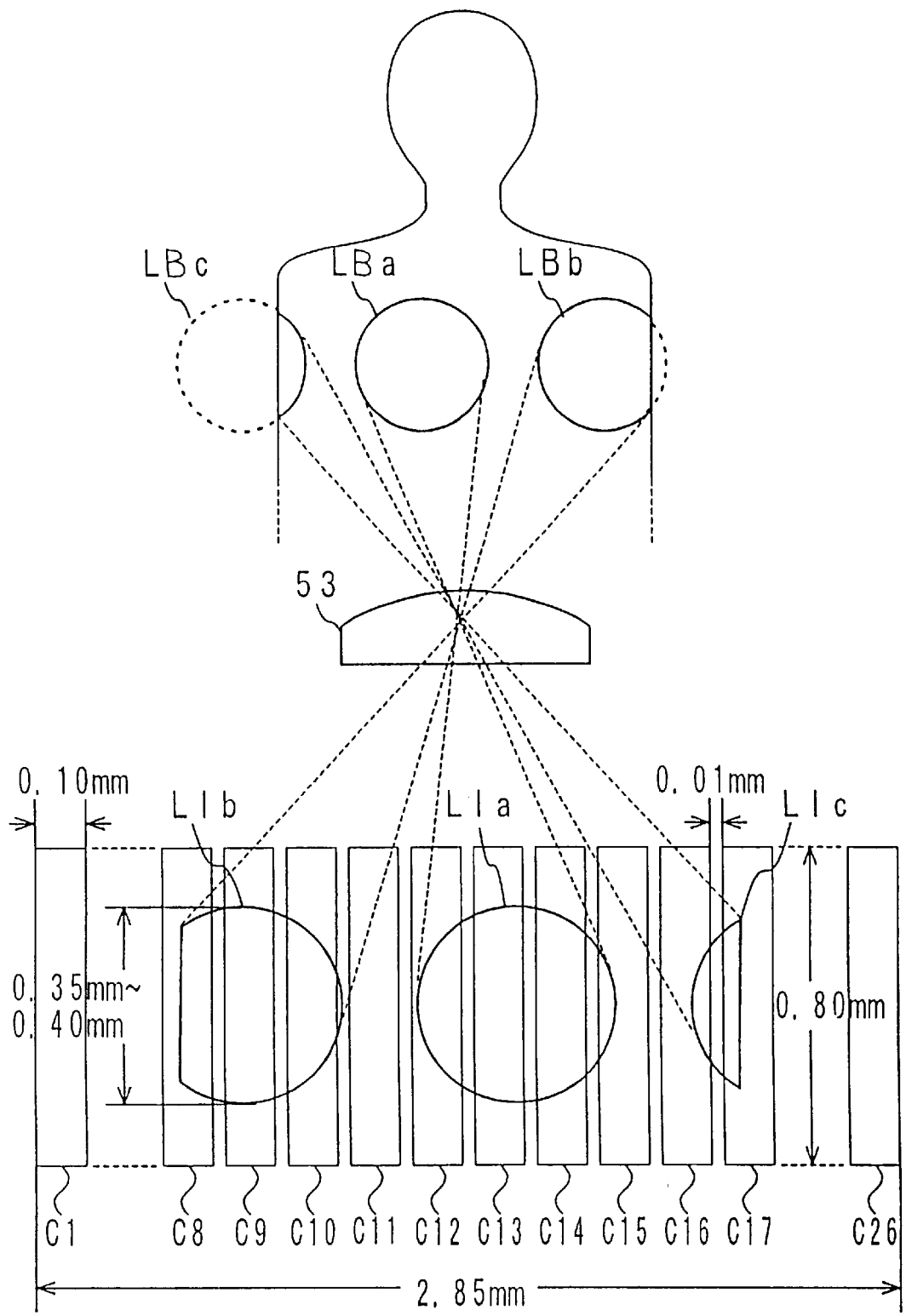
FIG. 3 is a view showing light receiving element cells and received light beams on cell faces according to the first embodiment.

FIG. 2 is a circuit diagram of the distance measuring circuit 16. An input circuit 54 has photocells C 1 through C 26 comprising a row of silicon photodiodes (SPDs), wherein the width of each SPD is 0.1 mm, the length thereof is 0.8 mm and a clearance between contiguous SPDs is 00.1 mm, as shown by FIG. 3. Accordingly, the width of a total of the photocells C 1 through C 26 is 2.85 mm. The photocell C 1 on the long distance side is the nearest to the light emitting elements and conversely, the photocell C 26 on the short distance side is the most remote from the light emitting elements. Current-to-voltage converting circuits IV 1 through IV 26 respectively convert output currents from the photocells C 1 through C 26 into voltages and output the voltages to an adder 55. The CPU 11 controls an output of the adder 55 by a 5 bit control signal CN. More specifically, the adder 55 outputs, based on the value of the control signal CN, one of 25 different outputs, that is, a sum of outputs from the current-to-voltage converting circuits IV 1 and IV 2 by turning ON the switches CS 1 and CS 2 when the control signal CN is 0, a sum of outputs from the current voltage converting circuits IV 2 and IV 3 by turning ON the switches CS 2 and CS 3 when the control signal CN is 1, . . . , a sum of outputs from the current voltage converting circuits IV 25 and IV 26 by turning ON the switches CS 25 and CS 26 when the control signal CN is 24.

A coupling capacitor Cg1 passes only an alternating current component of the output of the adder 55. An amplifying circuit 56 amplifies the output of the adder 55 by a predetermined gain. Switches GS 1 through GS 6 are switches used for determining the gain of the amplifying circuit 56. The CPU 11 controls the gain of the amplifying circuit 56 by changing the feedback resistance values of operational amplifiers Ag 1 and Ag 2 by a 3 bit control signal GN. More specifically, all of the switches GS 1 through GS 6 are turned OFF when the control signal GN is 0. The gain in this case is a maximum value of 256. When the control signal GN is 1, the switch GS 1 is turned ON and the total gain in this case is a half of the maximum value (i.e., 128) since the feedback resistance value of the operational amplifier Ag 2 is halved. Next, when the control signal GN is 2, the switch GS 2 is turned ON and the total gain is 64 since the feedback resistance value of the operational amplifier Ag 1 is halved. When the control signal GN is 3, the switch GS 3 is turned ON and the gain is 32, . . . , and when the control signal GN is 6, the switch GS 6 is turned ON and the gain is set to a minimum value of 4.

A switch 57 turns ON or OFF an output signal from the amplifying circuit 56 based on a control signal IN. An operational amplifier Ai comprises an integrating circuit 58 along with an integrating capacitor Ci wherein a control signal DC from the CPU 11 is used to discharge the integrating capacitor Ci. A voltage follower Vfi subjects an output voltage of the operational amplifier Ai to impedance conversion and outputs the conversion result to an analog/digital converter 11c (hereinafter referred to as an A/D converter). The A/D converter 11c is an 8-bit A/D converter which converts an output voltage from the voltage follower Vfi into a digital value and outputs the digital value to the CPU 11. An input voltage to the A/D converter 1ic is 4.2 volts, which is equally divided into 256 parts, whereby a voltage per digit increment is 16.4 millivolts.

Figure 4:
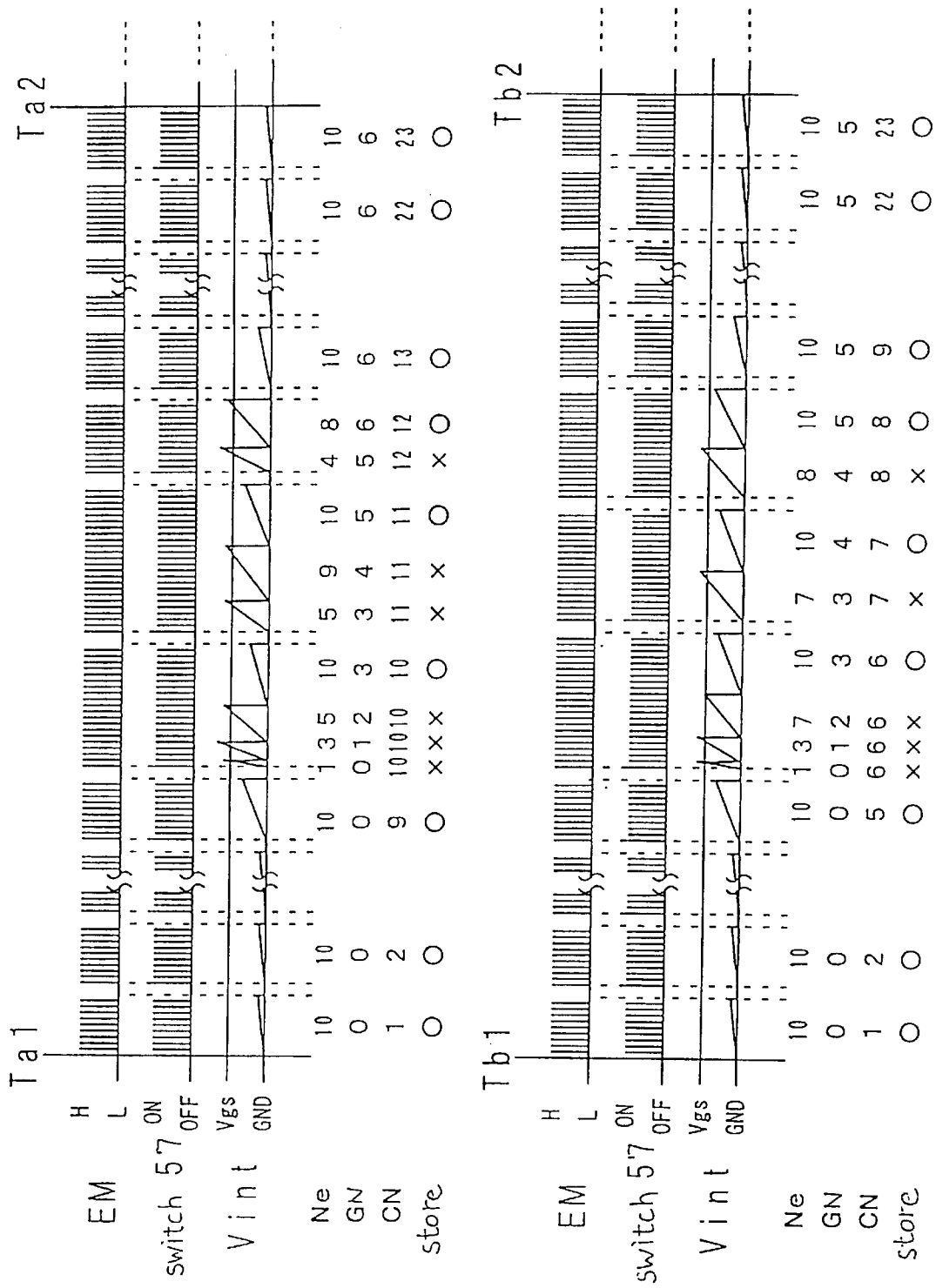
FIG. 4 is an earlier half of a time-sequential diagram according to the first embodiment.

Next, an explanation will be provided of the operation of the circuit of FIG. 2 with reference to FIG. 3 and FIG. 4. In the following explanation, the designation "cell" refers to one of the photocells, "double-cell" refers to a contiguous pair of photocells and "couple" refers to a contiguous pair of double-cells, or four contiguous photocells.

The distance measuring operation comprises three stages, including the first stage of determining a gain, the second stage of measuring a distance and the third stage of measuring an offset voltage change rate. Among these stages, in the gain determining stage, light is emitted first by a light emitting element 51a, then by a light emitting element 51b and then by a light emitting element 51c. A gain Ga, a gain Gb and a gain Gc, which are optimum gain values for the respective light emitting elements, are separately determined and finally, a combination of a light emitting element and a distance measuring gain G which is optimum in carrying out an actual distance measurement is determined.

First, the optimum gain Ga of the light emitting element 51a is determined by the following procedure. It is assumed that fluxes of measuring light of the respective light emitting elements are emitted onto an object as shown by FIG. 3. In this case, although the entire light emitting beam LBa from the light emitting element 51a is reflected by the chest of the object, light emitting beam LBb from the light emitting element 51b and light emitting beam LBc from the light emitting element 51c are incident on the arms of the object and portions thereof pass beyond the arm without being reflected and the so-called beam deficiency is caused. The reflected light from these beams form images on the row of photocells respectively as received beams LIa, LIb and LIc and the distance measuring device of the first embodiment measures the distance to the object based on the image forming information. Although fluxes of measuring light beams from the light emitting element 51a, the light emitting element 51b and the light emitting element 51c are illustrated as being simultaneously irradiated onto the object in FIG. 3, only one of these is actually irradiated at a time.

In this procedure, the coupled double-cell to be used in the distance measurement is also determined. First, the CPU 11 outputs the value "1" to the control signal CN and selects a double-cell consisting of photocells C 2 and C 3 prior to emitting signal light such that a sum of the voltages constitutes the output from the adder 55. Next, all of the switches GS 1 through GS 6 are turned OFF. In this case, the feedback resistance value of the operational amplifier Ag 2 is maximized. Accordingly, the gain of operational amplifier Ag 2 is also maximized (Tal of FIG. 4).

The CPU 11 generates a light emitting signal EM and a light emitting circuit 51 emits pulse light through a lens 52 for a predetermined number of times Ngs (for example, 10 times) toward an object. Pulse light reflected from the object is focused by a receiving lens 53 toward the row of SPDs. At first, the outputs of the photocells C 2 and C 3 are subjected to current/voltage conversion, amplified by the amplifying circuit 56, integrated by the integrating circuit 58 and the output voltage Vint is subjected to impedance conversion by the voltage follower Vfi and is output to the A/D converter 11c. The CPU 11 keeps the switch 57 OFF until a time period of T1 (for example, 10 microseconds) has elapsed from the start of light emission in order to secure rise times of the respective amplifiers accompanied by the start of light emission and alleviate influence of power source variation, and turns ON the switch 57 for a time period of T2 (for example, 10 microseconds) by generating the control signal IN after the time period T1 has elapsed. After finishing the aforementioned operation, the CPU 11 stops the light emitting operation and the integrating operation and awaits for a time period T3, (for example, 200 microseconds). This operation is repeated for a predetermined number of times. The CPU 11 compares the voltage Vint with a voltage Vgs and if it is larger than the voltage Vgs, the CPU 11 decreases the gain by turning ON the switches in the order of the switches GS 1, GS 2, ..., GS 6, and the light emission of the signal light is repeated again at each setting. In this case, the voltage Vgs is set to 16 digits, that is, approximately 260 millivolts.

Figure 5:
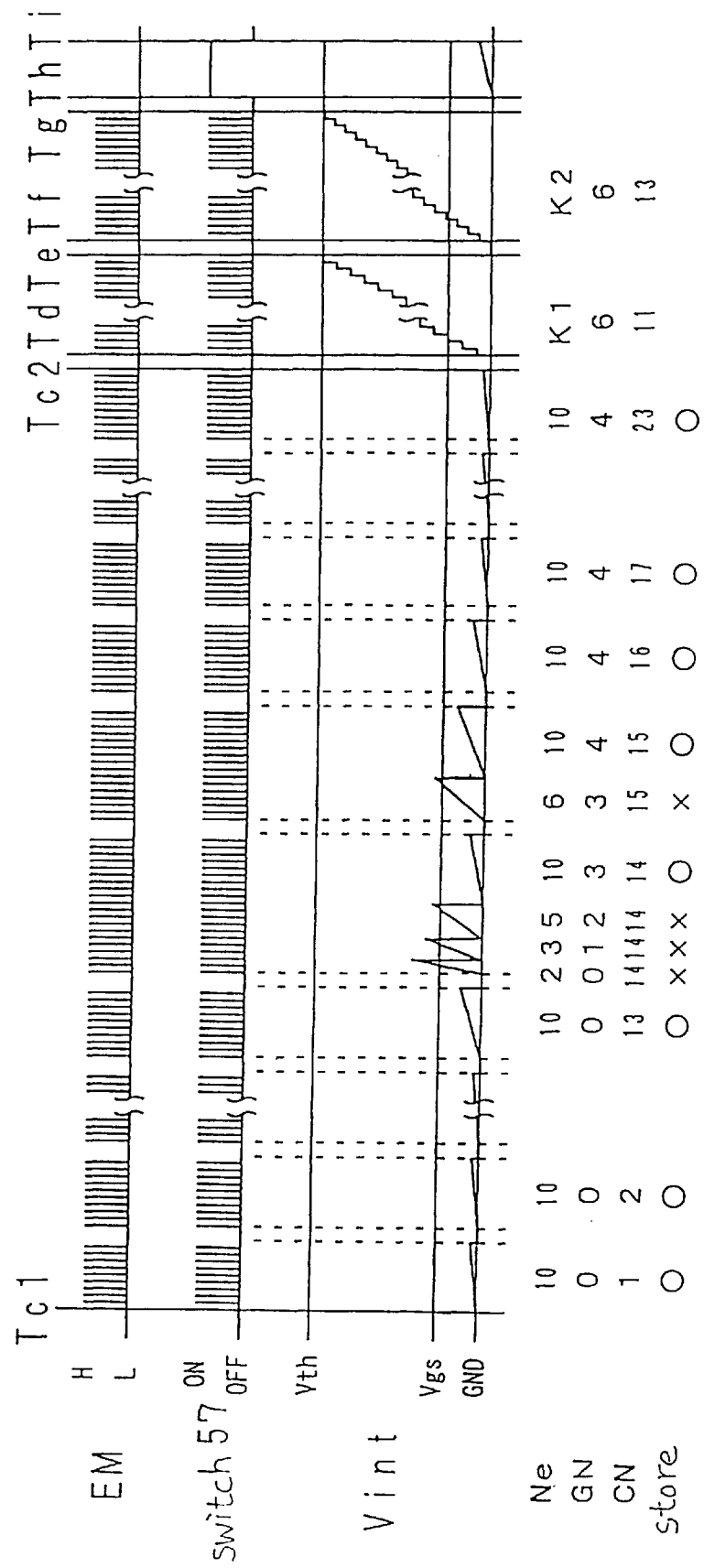
FIG. 5 is a later half of the time-sequential diagram according to the first embodiment.

"GN" in FIG. 4 and FIG. 5 designates a value of the control signal GN which corresponds to a number of the switches which are turned ON. As described, "0" signifies that all of the switches GS 1 through GS 6 are turned OFF. If GS is "1", the switch GS 1 is turned ON and if GS is "6", all switches including switch GS 6 are turned ON. Further, "CN" is a value of the signal CN representing a double-cell currently selected. As described, when the control signal CN is 0, a double-cell comprising the photocells C 1 and C 2 is selected, when the control signal CN is 1, a double-cell comprising the photocells C 2 and C 3 is selected, and so on, by which a total of 25 different double-cells are selected until the control signal CN reaches 24.

Figures 6, 7:
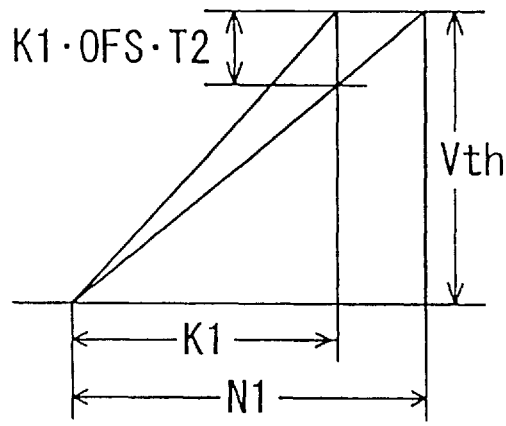
FIG. 6 shows a table in RAM used for a gain determining operation according to the first embodiment.
FIG. 7 is an explanatory view for explaining the principle of calculating an offset value according to the first embodiment.

For a given value of CN, when the voltage Vint becomes smaller than the voltage Vgs as a result of light emission for a predetermined number of times equal to Ngs by changing the gain of the amplifiers, the control signal CN, the control signal GN, the voltage Vint and the value Ne at this time are respectively stored as illustrated by FIG. 6. Then, the photocells C 3 and C 4 constituting a successive double-cell are again selected, and the operation is repeated from emission of a signal light. Further, when the voltage Vint exceeds the voltage Vgs before the light emission by the number of times of Ngs, if the control signal GN is smaller than 6, the gain is excessively large and accordingly, the gain is decreased by adding 1 to the control signal GN. When the control signal GN is already 6, it is impossible to set a gain of 6 or lower and the control signal CN, the control signal GN, the voltage Vint and the value Ne in this case are also stored as illustrated by FIG. 6.

In FIG. 3, a received light beam LIa is incident on the photocells C 12 through C 15 and accordingly, an output of a double-cell comprising the photocells C 13 and C 14 (CN=12) is maximized. Therefore, as is apparent from FIG. 4, a double-cell of the photocells C 12 and C 13 (CN=11) and a double-cell of the photocells C 14 and C 15 (CN=13) are selected as the coupled double-cell for measuring the distance. In this manner, the respective control signals CN of the coupled double-cell for measuring the distance necessarily differ by 2. Although the diameter of the received light beam LIa is 0.35 mm in this example, the diameter differs depending on the distance of an object and the optical system is adjusted such that the value becomes approximately 0.35 through 0.40 mm. Accordingly, the number of photocells used in the distance measurement is most suitably 4.

When the gain determining information having the control signals CN of 1 through 23, that is, ranging from the double-cell of the photocells C 2 and C 3 to the double-cell of the photocells C 24 and C 25 is stored to the table of FIG. 6 in the RAM 11b in respect of the light emitting element 51a in this manner, the coupled double-cell for measuring the distance is finally determined as follows.

First, when there are double-cells in each of which the control signal GN reaches 6, a coupled double-cell including at its center a double-cell having the least value of Ne is determined as the coupled double-cell DCa. When there are a plurality of double-cells in each of which the control signal GN reaches 6 and the value Ne of each is the number of times Ngs, a coupled double-cell including at its center a double-cell having the largest voltage Vint is determined as the coupled double-cell DCa. Further, when there is no photocell in which the control signal GN reaches 6, a coupled double-cell including at its center a double-cell having the largest voltage Vint among the double-cells in each of which the control signal GN is large, that is, the double-cells in each of which the light emitting operation is finished by the lowest gain is determined as the coupled double-cell DCa (Ta2 of FIG. 4).

In the case of FIG. 6, the control signal GN is 6 when the control signal CN is 12 through 23, that is, in respect of the double-cell of the photocells C 13 and C 14 through the double-cell of the photocells C 25 and C 26 where the light emitting operation is carried out with the maximum gain. Among them, the values Ne are provided with two values of 8 and 10 and the value Ne is the least when the control signal CN is 12. The double-cell having the control signal CN of 12 is a combination of the photocells C 13 and C 14 and therefore, the coupled double-cell including the combination at inside thereof is the coupled double-cell of the photocells C 12 and C 13 and the photocells C 14 and C 15 and these double cells are used respectively in the following distance measuring operation.

Next, determination of a gain Gb and a coupled double-cell DCb is carried out by emitting light by the light emitting element 51b (Tb1–Tb2 of FIG. 4) and determination of a gain Gc and a coupled double-cell DCc is carried out by emitting light by the light emitting element 51c (Tc1–Tc2 of FIG. 5) and a gain G for measuring distance is finally determined as follows. First, the largest one of the gains Ga, Gb and Gc is determined. When only one of these values is the highest gain, it is selected as the gain G for measuring distance and a combination of the light emitting element and the coupled double-cell DC for measuring distance in this case is used for measuring the distance. When a plurality of these values is the highest gain, the light emitting element 51a is given the highest priority and successively, the light emitting element 51b is given the second highest priority and the light emitting element 51c is given the lowest priority.

After the coupled double-cell for measuring the distance is determined in this manner, the distance measuring operation is then carried out. First, the CPU 11 controls a sum voltage of an output from one of the double-cells for measuring distance (in this example, double-cell of photocells C 12 and C 13) to be an output from the adder 55, outputs the control signal DC to close the switch Sw to discharge the integrating capacitor Ci, and thereafter outputs the light emitting signal EM whereby pulse light similar to that in the case of gain determination is emitted from the light emitting circuit 51 toward the object (Td of FIG. 5). The output from the adder 55 at this moment is amplified by the operational amplifier Ag 2, integrated by the operational amplifier Ai and output to the A/D converter 11c by the voltage follower Vfi. The CPU 11 compares the output voltage Vint from the A/D converter 11c with Vth, finishes emitting the pulse light when the voltage Vint becomes equal to or higher than the voltage Vth and stores a number of emissions until then at a pertinent address of the RAM 11b as a number of times K1 (Te of FIG. 5). Here, the voltage Vth is set to 56 digits, that is, approximately 920 millivolts.

The same operation is also repeated with respect to the other one of the double-cells for measuring distance (in this example, double-cell of photocells C 14 and C 15) (Tf of FIG. 5) and the number of emissions is stored at a pertinent address of the RAM 11b as a number of times K2 (Tg of FIG. 5).

Consider a case where scattered light is incident on the photocells. Normally, scattered light is incident on a position remote from the position of the received light beam with intensity far weaker than that of the received light beam. Accordingly, when a photocell providing a continuous output, such as a position sensitive device ("PSD") or the like, or all of the SPDs are used in measuring a distance, a signal current caused by the influence of the scattered light cannot be separated. However, according to the distance measuring device of this embodiment, outputs from photocells other than the coupled double-cell for measuring the distance are not used in measuring the distance and accordingly, almost no influence of the scattered light is effected in the result of measuring the distance.

Finally, the offset voltage change rate Ofs is measured to remove the influence of offset voltages. First, after discharging the integrating capacitor Ci by turning on the switch Sw, the switch 57 is turned ON and only external light is integrated over a predetermined time period of Tofs without emitting light by the light emitting circuit 51 (Th of FIG. 5). At this moment, a potential difference is caused between terminals of the integrating capacitor Ci due to influence of drift currents of the operational amplifier Ag 2 and the operational amplifier Ai and the voltage Vint across the terminals of the integrating capacitor Ci is changed to a positive or negative value. After elapse of the time period Tofs, the switch 57 is turned OFF and the offset voltage change rate Ofs per unit time is calculated by dividing the voltage Vint by the time period of Tofs (Ti of FIG. 5). Successively, a value N1 is calculated by the following Equation (1) from the number of times K1 stored in the RAM 11b and a value N2 is calculated by Equation (2) from the number of times K2, respectively.

$$N1 = (Vth \times K1)/(Vth - Ofs \times K1 \times T2) \quad (1)$$

$$N2 = (Vth \times K2)/(Vth - Ofs \times K2 \times T2) \quad (2)$$

When the values N1 and N2 and the offset voltage change rate Ofs are calculated as described above, the CPU 11 reads these values from the RAM 11b and calculates a value X based on Equation (3).

$$X = N1/(N1 + N2) \quad (3)$$

The principle of calculating the values N1 and N2 from the number of times K1 and K2 is shown in FIG. 7. When the voltage reaches the voltage Vth by light emission of a number of times K1, an offset voltage caused by drift currents of the amplifying circuit 56 and the integrating circuit 58 is inevitably included. This corresponds to voltage designated by Ofs K1 T2. Therefore, if there is no offset voltage, the voltage does not reach the voltage Vth when light emission is not carried out by the value N1. The value N1 is calculated as in Equation (1) as the principle of similarity of a triangle. The value N2 is similarly calculated from the number of times K2. Although the offset voltage can be positive or negative, it can be calculated by the same equation by the principle described above in either of the cases.

When the value X is calculated, the CPU 11 calculates the distance to an object in reference to a table corresponding to a coupled double-cell for measuring distance in the ROM 11a shown by FIG. 8, drives the focus lens 14a to a focusing position by the focus lens driving circuit 14 and opens and closes the shutter 12a by the shutter driving circuit 12 whereby exposure is performed with respect to the film 18a.

Figure 9:
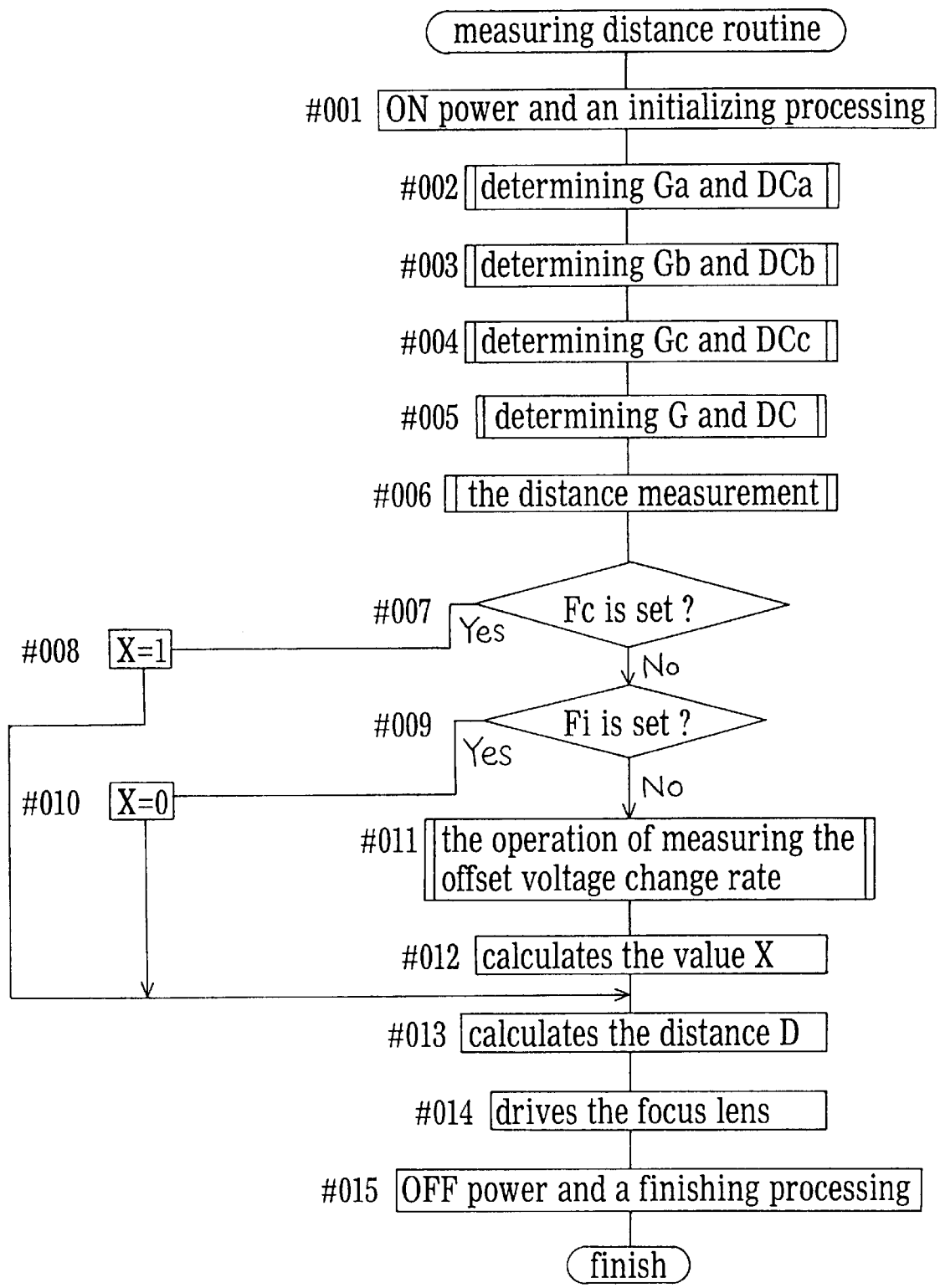
FIG. 9 shows a main routine illustrating the distance measuring operation of the first embodiment.

The above-described distance measuring operation is represented by flowcharts shown by FIG. 9 through FIG. 14. First, an explanation will be given of a main flowchart with reference to FIG. 9. When the CPU 11 detects operation of the full push switch 43b, the CPU 11 carries out a light measuring operation and successively proceeds to a distance measuring operation as shown by FIG. 9. When the CPU 11 proceeds to the distance measuring operation, the CPU 11 first turns on power source of the distance measuring circuit 16 (#001). Successively, the CPU 11 emits light by the light emitting element 51a and determines the gain Ga and the coupled double-cell DCa (#002). Next, the CPU 11 emits light by the light emitting element 51b and determines the gain Gb and the coupled double-cell DCb (#003). Further, the CPU 11 emits light by the light emitting element 51c and determines the gain Gc and the coupled double-cell DCc (#004). When these steps are finished, the CPU 11 determines the maximum gain G and the combination of the coupled double-cell DC and the light emitting element in this case among three of the coupled double-cells DC and three of the gains G which have thus far been obtained and determines the coupled double-cell DC for measuring the distance and the gain G for measuring distance (#005).

Next, the CPU 11 calculates the number of times K1 and K2 by carrying out the distance measurement (#006). At this occasion, when the close flag Fc is set (#007), the value X is set to 1 (#008) and when the infinity flag Fi is set (#009), the value X is set to 0 (#010), respectively and the operation jumps to a step #013. Then, the CPU 11 calculates the offset voltage change rate Ofs by measuring the offset voltage (#011). The value X is calculated from the numbers of times K1 and K2 and the offset voltage change rate Ofs mentioned above (#012) and the distance D is calculated from the value X by referring to a table stored in the ROM 11a shown by FIG. 8 (#013) and the focusing lens 14a is driven to the focusing position (#014). Finally, the CPU 11 turns OFF the power source of the distance measuring circuit 16 after carrying out finishing processing (#015) and finishing the distance measuring routine and carries out exposure operation in respect of the film 21 by opening and closing the shutter 12a.

Next, an explanation will be given of respective subroutines or the gain determining operation at step #002, the distance measuring operation at step #006 and the operation of measuring the offset voltage change rate at step #011 in reference to FIG. 10 through FIG. 12, FIG. 13 and FIG. 14.

Figure 10:
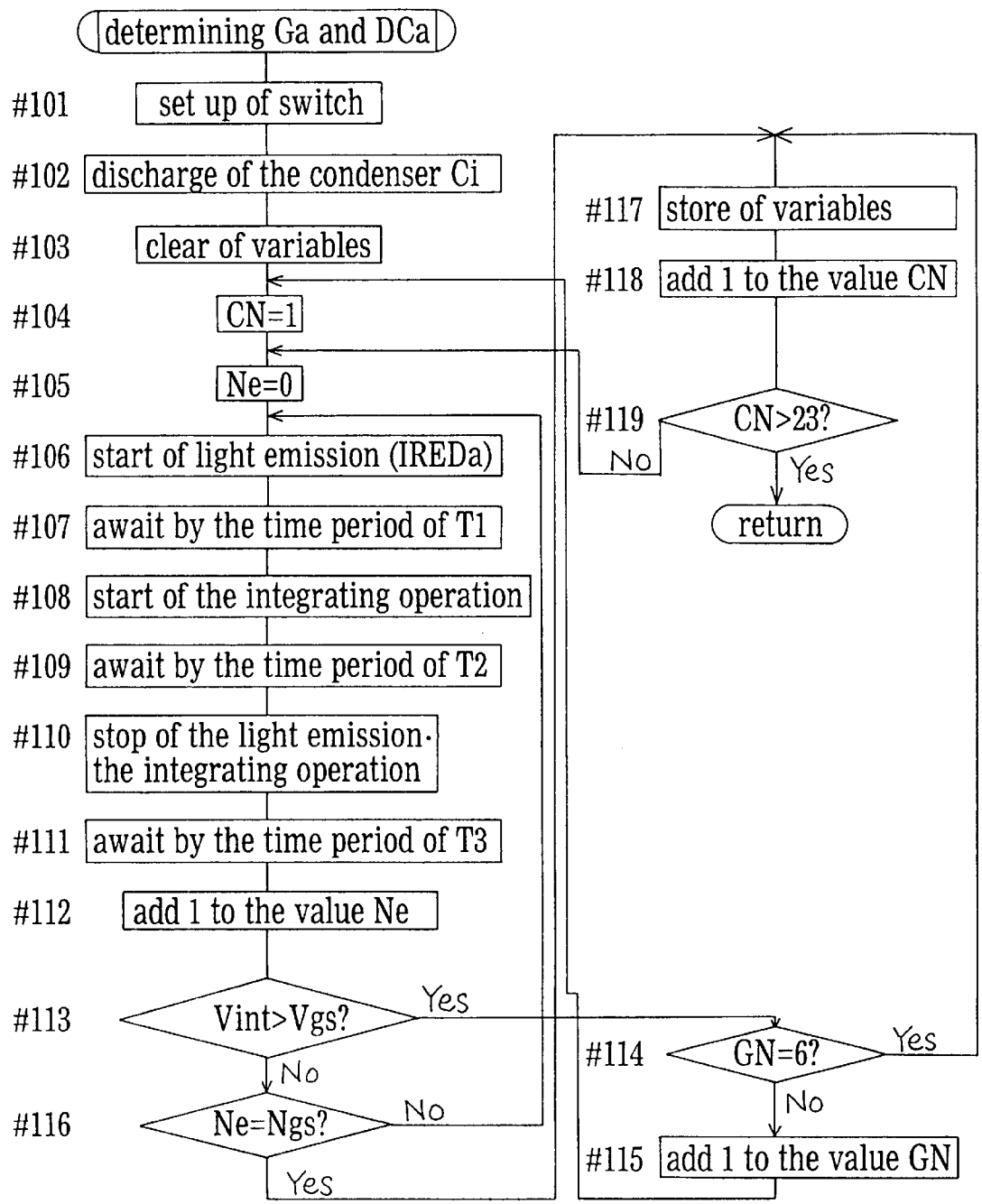
FIG. 10 shows a subroutine illustrating the operation of determining a gain Ga in the first embodiment.

First, an explanation will be given of the subroutine of the gain determining operation at step #002 in reference to FIG. 10. When the CPU 11 proceeds to the subroutine, the CPU 11 sets respective control lines to "L" to turn OFF all the switches of the distance measuring circuit 16 (#101). The CPU 11 turns ON the switch Sw by setting the control signal DC to "H" level by which the integrating capacitor Ci is discharged. When the capacitor Ci has been discharged, the control signal DC becomes "L" (#102). Successively, the CPU 11 clears the gain Ga to 0 and resets respectively the infinity flag Fi and the close flag Fc (#103). Further, the CPU 11 sets the control signal CN to 1 (#104) and clears the value Ne to 0 (#105).

Then, the CPU 11 outputs the light emitting signal EM and emits measuring light to an object (#106). The CPU 11 awaits until a time period T1 has elapsed since start of light emission to secure rise times of the respective amplifiers accompanied by the start of light emission and alleviate influence of power source variation (#107) and starts integrating operation by setting the integrating signal IN to "H" at a time point where the time period T1 has elapsed (#108) and then, the CPU 11 awaits a time period of T2 (#109). When the time period T2 has elapsed, the CPU 11 stops light emitting and integrating operations (#110) and awaits by a time period of T3 (#111). Then, the CPU 11 adds 1 to the value Ne (112). The CPU 11 compares the voltage Vint with the voltage Vgs (#113), and when the voltage Vint is larger than the voltage Vgs, the CPU 11 jumps to step #114. When the voltage Vint is equal to or larger than the voltage Vgs, the CPU 11 successively confirms whether the control signal GN is 6 (#114) and when the control signal GN is less than 6, the CPU 11 adds 1 to the control signal GN (#115) and the operation jumps to step #104. When the control signal GN is 6, the operation jumps to step #117.

When the voltage Vint is equal to or less than the voltage Vgs at step #113, the CPU 11 confirms whether the value Ne is a constant number NgS (#116) and when the value Ne is less than constant number NgS, the operation jumps to step #106 and repeats light emitting and integrating operations. When the value Ne is the constant number NgS, the CPU 11 stores current values of the control signal CN, the control signal GN, the voltage Vint and the value Ne respectively to predetermined addresses of the RAM 11b as shown by FIG. 6 (#117) and adds 1 to the control signal CN. Further, the CPU 11 adds 1 to the control signal CN (#118), confirms whether the control signal CN reaches 23 (#119) and when the control signal CN does not reach 23, since double-cells to which light emission is not finished remain, the operation returns to step #105, when the control signal CN reaches 23, the light emission has been carried out with respect to all the double-cells and accordingly, the CPU 11 determines the coupled double-cell used for the distance measurement in reference to FIG. 6 and finishes the subroutine.

Figure 11:
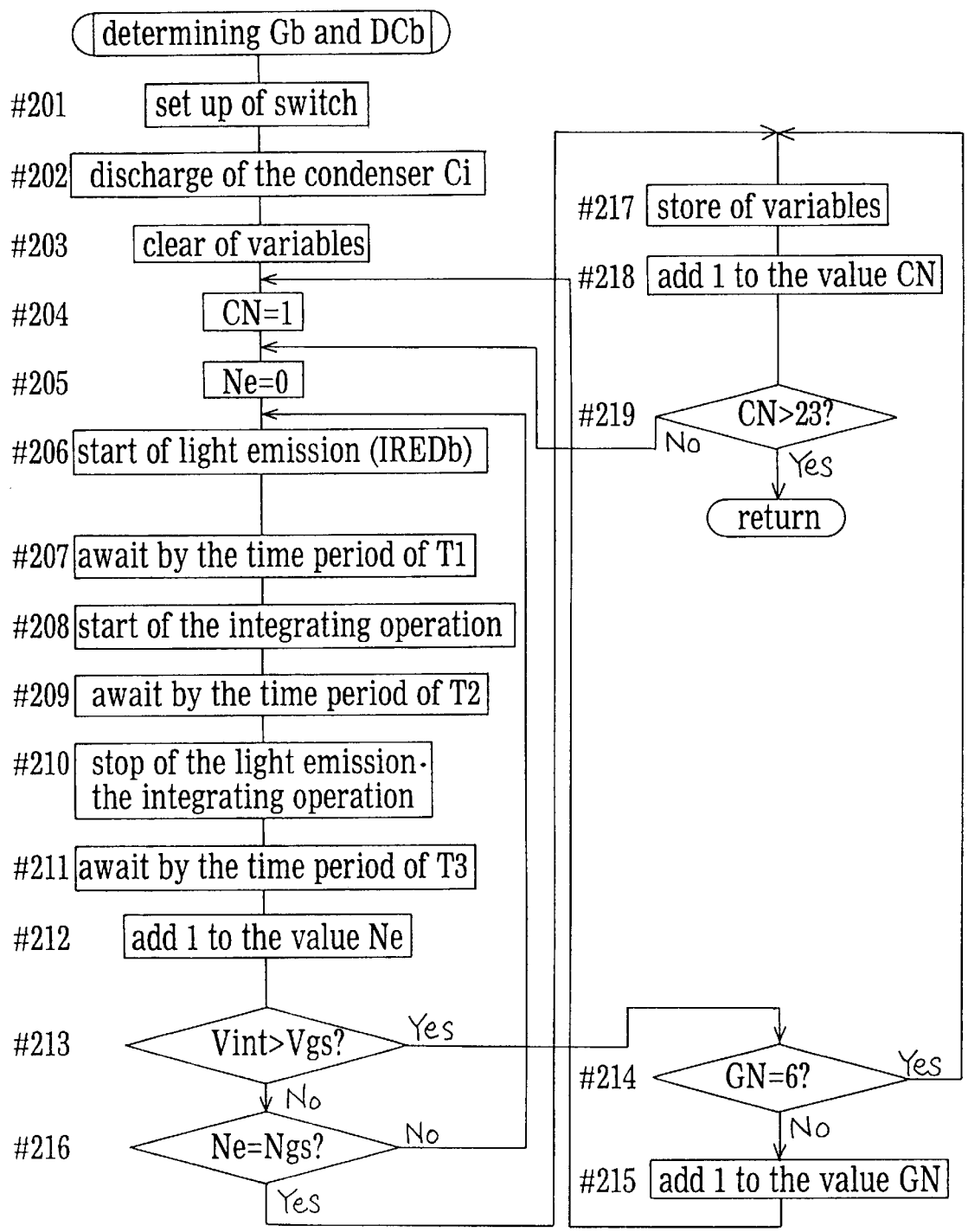
FIG. 11 shows a subroutine illustrating the operation of determining a gain Gb in the first embodiment.
Figure 12:
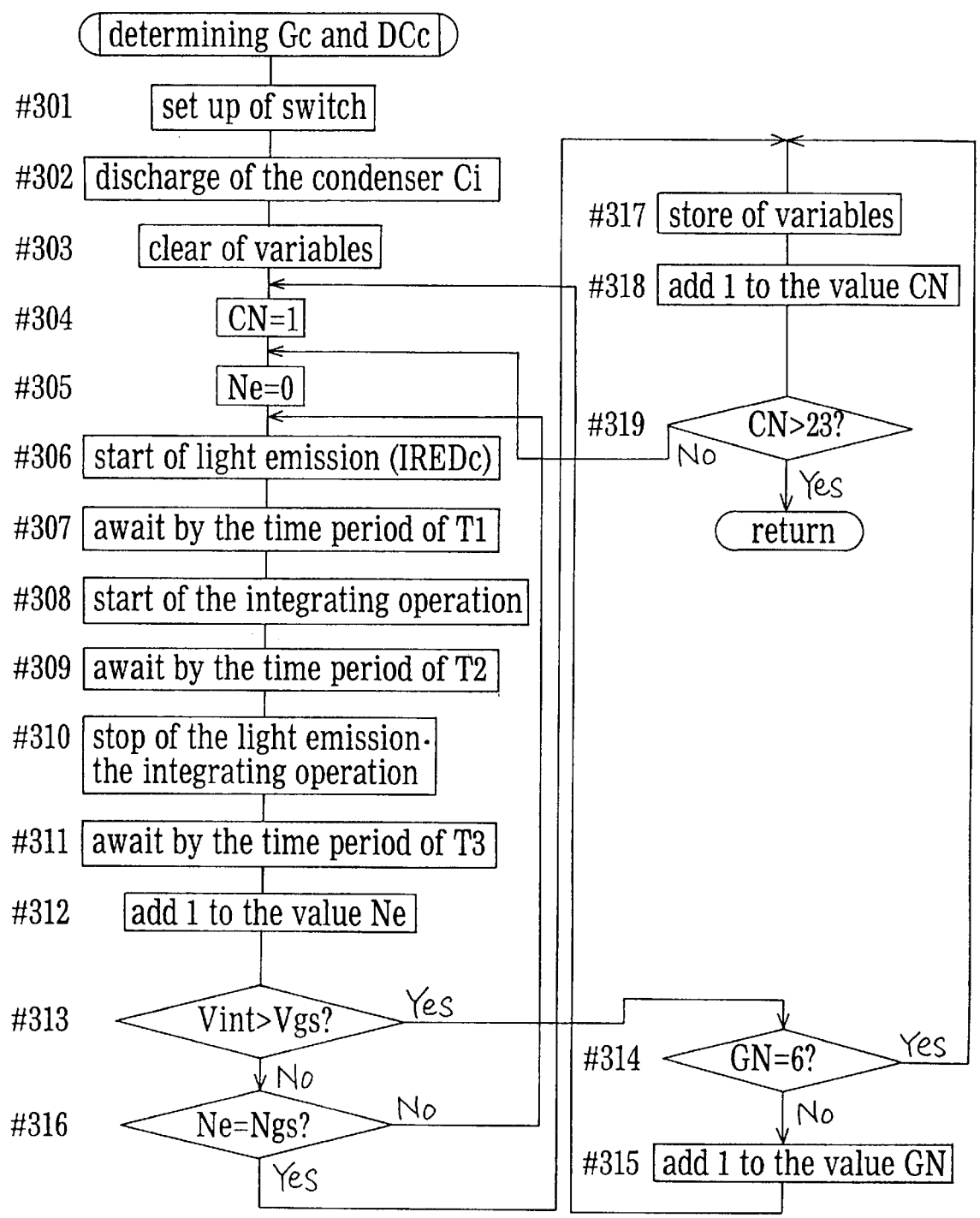
FIG. 12 shows a subroutine illustrating the operation of determining a gain Gc in the first embodiment.

Although subroutines for the gain determining operation of steps #003 and #004 are respectively shown by steps #201 through #219 in FIG. 11 and steps #301 through #319 in FIG. 12, the basic flow is the same as in the case of step #002 and therefore, a detailed explanation thereof will be omitted.

Figure 13:
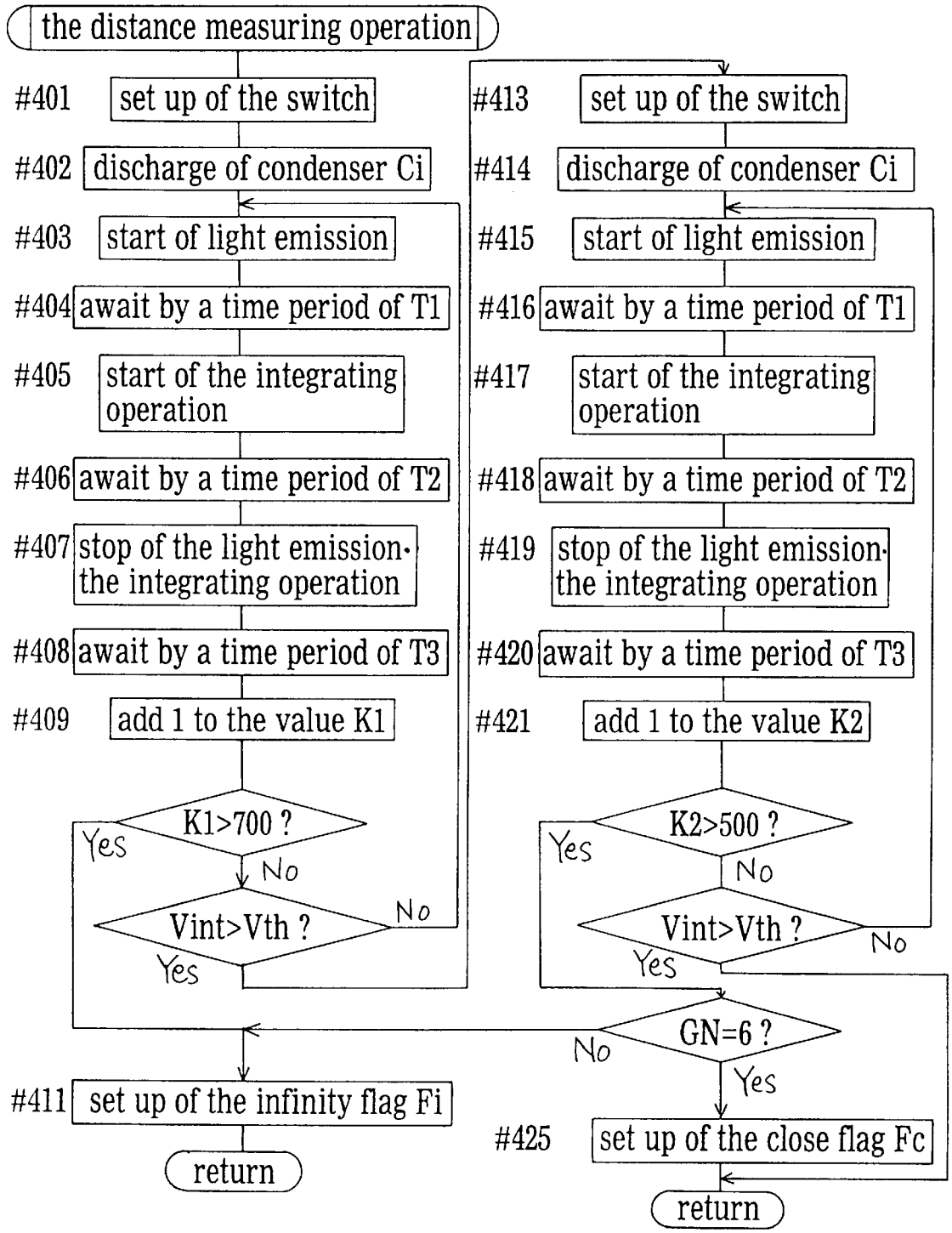
FIG. 13 shows a subroutine illustrating the distance measuring operation of the first embodiment.

Next, an explanation will be given of the subroutine of the distance measuring operation at step #006 in reference to FIG. 13. When the operation proceeds to the subroutine, the CPU 11 outputs a signal selecting one of the double-cells that is near to the light emitting element (near to the photocell C 1) among the double-cells for measuring the distance to the control signal CN (#401). Successively, the CPU 11 turns ON the switch Sw by setting the control signal DC to "H" level and discharges the integrating capacitor Ci. After the capacitor Ci has been discharged, the control signal DC is set to "L" (#402).

Then, the CPU 11 outputs the light emitting signal EM and emits measuring light to an object (#403). Here, the CPU 11 awaits until the time period T1 has elapsed since start of light emission to secure the rise times of the respective amplifiers accompanied by the start of light emission and alleviate influence of power source variation (#404), starts integrating operation by changing the control signal IN to "H" at a time point where the time period T1 has elapsed (#405), and awaits for the time period T2 (#406). After finishing the operation, the CPU 11 stops light emitting and integrating operations (#407) and awaits for the time period of T3 (#408). Then, the CPU 11 adds 1 to the number of times K1 (#409). Here, when the number of times of light emission K1 exceeds 700 (#410), it is determined that the object is disposed at a very long distance and pertinent photographing cannot be conducted and accordingly, the CPU 11 sets the infinity flag Fi and finishes the subroutine (#411). Further, when the voltage Vint does not reach the voltage Vth at a number of times of 700 or less, the operation returns to #403 and repeats light emitting and integrating operations (#412). When the voltage Vint reaches the voltage Vth, the CPU 11 successively outputs a signal selecting one of double-cells for measuring distance that is opposed to the side of the light emitting element (side near to photocell C 26) to the control signal CN (#413). Successively, the CPU 11 sets the control signal DC to "H" level, turns ON the switch Sw and discharges the integrating capacitor Ci. After the capacitor Ci has been discharged, the control signal DC is set to "L" (#414).

Then, the CPU 11 outputs the light emitting signal EM and emits measuring light to an object (#415). Here, the CPU 11 awaits until the time period T1, (for example 40 micro seconds) has elapsed since start of light emission to secure the rise times of the respective amplifiers accompanied by the start of light emission and alleviate influence of power source variation (#416), starts integrating operation by setting the control signal IN to "H" at a time point where the time period T1 has elapsed (#417) and awaits for the time period T2 (for example, 60 microseconds) from then (#418). After finishing the operation, the CPU 11 stops light emitting and integrating operations (#419) and awaits for the time period T3 (for example, 1900 microseconds) (#420). Then, the CPU 11 adds 1 to the number of times K2 (#421). Here, when the number of times of light emission K2 exceeds 500 and the control signal GN is 6 (#422), it is determined that the object is at a close distance and pertinent photographing cannot be conducted and accordingly, the CPU 11 sets the close flag Fc and finishes the subroutine (#425). Further, when the number of times of light emission K2 exceeds 500 and the control signal GN is less than 6 (#424), it is determined that the object is at a very long distance and pertinent photographing cannot be conducted and therefore, the CPU 11 sets the infinity flag Fi and finishes the subroutine (#411). Further, when K2 is equal to or less than 500 and the voltage Vint does not reach the voltage Vth, the CPU 11 returns to #415 and repeats the light emitting and integrating operations and when the voltage Vint reaches the voltage Vth, the CPU 11 finishes the subroutine.

Figure 14:
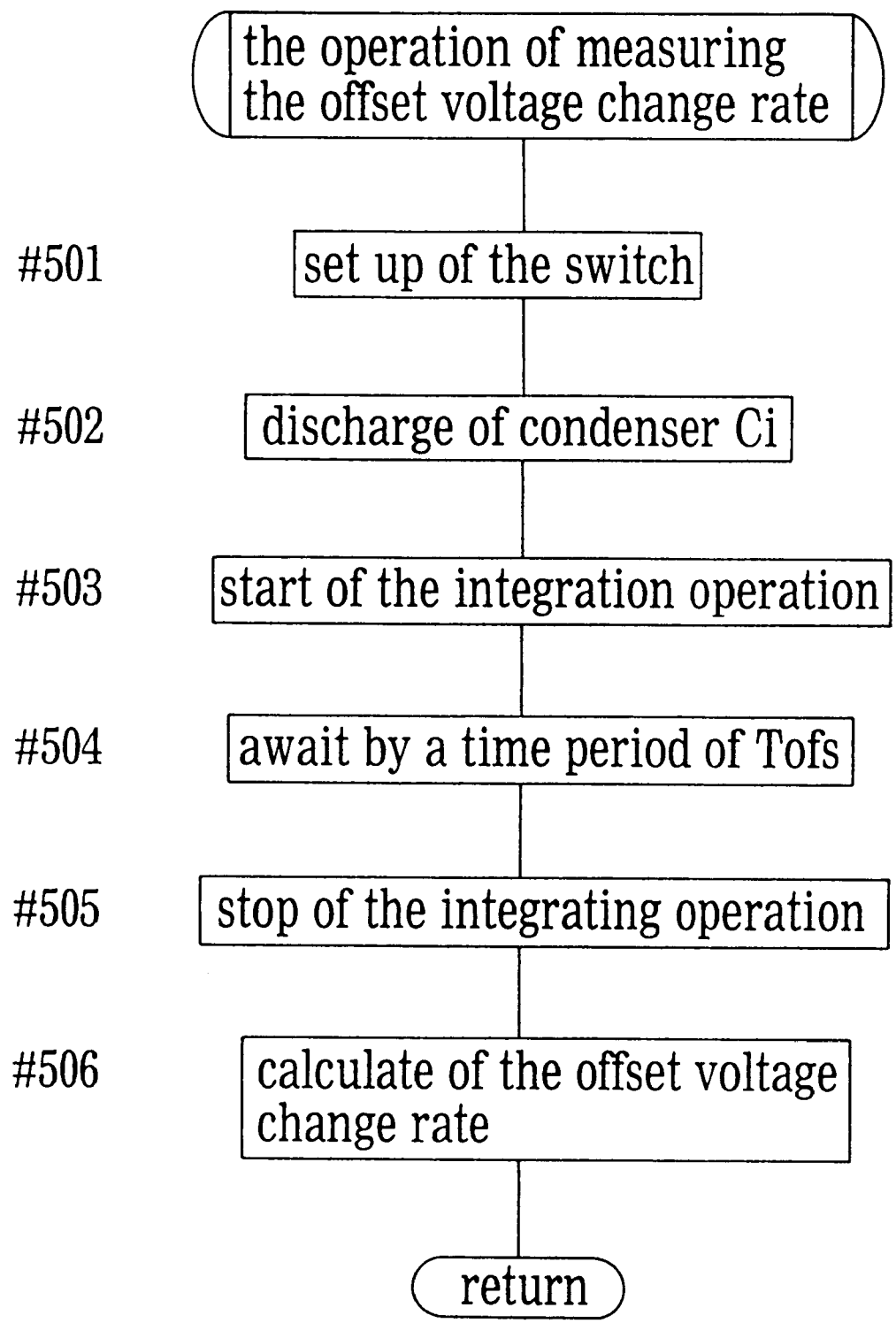
FIG. 14 shows a subroutine illustrating the operation of measuring an offset voltage change rate.

Next, an explanation will be given of the subroutine of the operation of measuring the offset voltage change rate at step #011 in reference to FIG. 14. When the operation proceeds to the subroutine, the CPU 11 turns OFF all the switches CS 1 through CS 26 (#501). Successively, the CPU 11 turns ON the switch Sw by setting the control signal DC to "H" level and discharges the integrating capacitor Ci. After discharging the capacitor Ci, the control signal DC is set to "L" (#502). Then, the CPU 11 turns ON the switch 57 and starts integrating operation at the integrating circuit 58 without emitting light by the light emitting element (#503). The CPU 11 awaits for the time period of Tofs (#504) as it is, turns OFF the switch 57 (#505), calculates the offset voltage change rate Ofs (#506) and finishes the subroutine.

Although according to the above-described embodiment, the gain is determined by setting two photocells as one group, a number of photocells constituting one group is not limited to 2. Further, although the distance measuring operation is carried out by couples of photocell groups each of which is constituted by two photocells, similar to the case of determining the gain, a number of photocells constituting one group may be changed in accordance with the magnitude or the shape of the received light beam.

Figure 15:
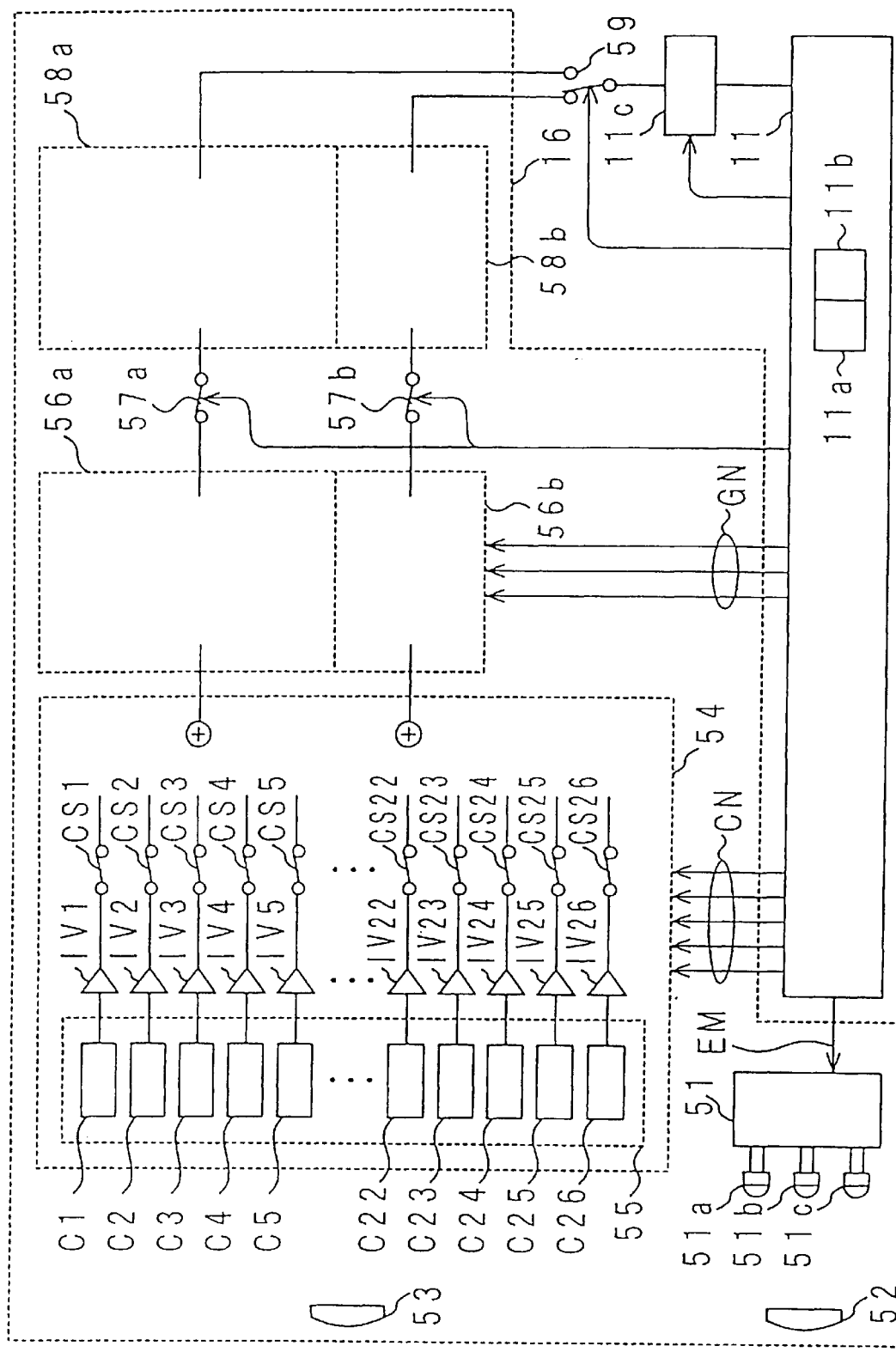
FIG. 15 is a circuit diagram of a distance measuring device according to a second embodiment of the present invention.

Further, a second embodiment of the present invention will now be described. In the second embodiment, the distance measuring device has two amplifying circuits 56 and two integrating circuits 58 in parallel, as shown by FIG. 15. The construction of the amplifying circuits 56a and 56b is similar to that of the amplifying circuit 56 shown in the first embodiment and the construction of the integrating circuits 58a and 58b is similar to that of the integrating circuit 58 of the first embodiment. Accordingly, an explanation of the circuit construction of the second embodiment will be omitted herein. When the circuit shown in FIG. 15 is used, operation is similar to that in the first embodiment and the operation of determining the gain G for measuring distance and the coupled double-cell DC for measuring distance is performed by either of the amplifying circuits 56a and 56b and voltage subsequent circuits. However, the second embodiment is capable of shortening the total time period needed for distance measurement since the distance measurement operation is performed by the two amplifying circuits 56a and 56b in parallel.

Further, as another embodiment, when the maximum gain (gain Ga=6) is obtained by the light emitting element 51a, the distance measurement may be carried out as it is by using the coupled double-cell provided by the light emitting element 51a without carrying out distance measurement by using the light emitting element 51b and the light emitting element 51c.

As described above, according the distance measuring device for a camera of the present invention uses a combination of a plurality of light emitting elements and photocells comprising a row of SPDs and distance measurement is carried out by using a light emitting element and photocells having a larger receiving light intensity. Therefore, a distance measuring device resistent to beam deficiency can be provided.

Further, when two processing circuits are provided and outputs from coupled double-cells are processed in parallel in measuring the distance, faster distance measurement can be conducted.

What is claimed is:

1. A distance measuring device for a camera comprising:
a plurality of light-emitting elements for emitting a measuring light to an object;
a plurality of light-receiving elements for receiving measuring light reflected by the object;
an adding circuit for adding outputs of a selected plurality of contiguous light-receiving elements;
an amplifying circuit for amplifying an output of the adding circuit;
an integrating circuit for integrating an output of the amplifying circuit; and
calculating means for calculating a distance to the object based upon an output of the integrating circuit;
wherein the calculating means includes means for performing a pre-measurement process including determining a combination comprising one of the light-emitting elements at which a maximum amplification gain is obtained and a first group of contiguous light-receiving elements at which a result of the addition is maximized in response to a light emitting and detecting operation, selecting a second group of light-receiving elements comprising the first group of light-receiving elements and one of a single and a plurality of the light-receiving elements contiguous to the first light-receiving element group from the determined light-emitting element and the determined first group of light-receiving elements, and dividing the second group of light-receiving elements into a plurality of subgroups, and for performing a distance measurement operation by measuring the distance to the object based on outputs from the respective divided subgroups.

2. A distance measurement device according to claim 1; wherein the amplifying circuit comprises a two-stage variable-gain amplifier circuit.

3. A distance measurement device according to claim 2; wherein each stage of the two-stage variable-gain amplifier circuit comprises a variable-gain amplifier having a feedback loop comprising a plurality of resistors and switches for selectively connecting respective resistors to the feedback loop.

4. A distance measurement device according to claim 3; wherein the calculating means includes means for performing a gain-setting procedure comprising the steps of controlling the light-emitting elements to emit a predetermined number of pulses of light, controlling the adding circuit to add outputs of selected ones of the light-receiving elements until an output of the integrating circuit reaches a predetermined value, and, if the output of the integrating circuit exceeds the predetermined value before the predetermined number of pulses of light have been emitted, sequentially reducing the gain of the variable-gain amplifiers.

5. A distance measurement device according to claim 3; wherein the integrating circuit comprises an amplifier, an input resistor, an integrating capacitor and a voltage follower.

6. A distance measurement device according to claim 1; wherein the light-receiving elements comprise SPDs arranged in a row.

7. A distance measurement device according to claim 1; wherein the light-receiving elements comprise SPDs arranged in a row, each having a width of 0.1 mm, a length of 0.8 mm, and wherein a space of 0.01 mm is provided between contiguous SPDs.

8. A distance measurement device according to claim 1; wherein the calculating means includes means for calculating an offset value by controlling the integrating circuit to integrate outputs of the adding circuit when no light is emitted by the light-emitting elements and using the offset value to correct a calculated distance value to compensate for inaccuracies inherent in circuit components of the distance measurement device.

9. A distance measuring device for a camera comprising:
a plurality of light-emitting elements for emitting measuring light to an object;
a plurality of light-receiving elements for receiving measuring light reflected by the object;
a plurality of adding circuits for performing an addition of outputs of selected pluralities of contiguous ones of the light-receiving elements;
a plurality of amplifying circuits each for amplifying an output from a respective one of the plurality of adding circuits;
a plurality of integrating circuits each for integrating an output from a respective one of the plurality of amplifying circuits; and calculating means for calculating a distance to the object based on outputs of the plurality of integrating circuits; wherein the calculating means includes means for performing a pre-measurement process including determining a combination comprising one of the light-emitting elements at which a maximum amplification gain is obtained and a first group of light-receiving elements at which a result of the addition is maximized, setting a second group of light-receiving elements comprising the first group of light-receiving elements and a single one or a plurality of the light-receiving elements contiguous to the first group of light-receiving elements from the determined light-emitting element and the determined first group of light-receiving elements, and dividing the second group of light-receiving elements into a plurality of subgroups, and for performing a distance measurement operation by measuring the distance to the object based on outputs from the respective divided subgroups.

10. A distance measurement device according to claim 9; wherein each amplifying circuit comprises a two-stage amplifier circuit.

11. A distance measurement device according to claim 10; wherein each stage of the two-stage amplifier circuit comprises a variable-gain amplifier having a feedback loop comprising a plurality of resistors and switches for selectively connecting respective resistors to the feedback loop.

12. A distance measurement device according to claim 11; wherein the calculating means includes means for performing a gain-setting procedure comprising the steps of controlling the light-emitting elements to emit a predetermined number of pulses of light, controlling the respective adding circuits to add outputs of selected ones of the light-receiving elements until an output of the integrating circuit reaches a predetermined value, and, if the output of the respective integrating circuits exceeds the predetermined value before the predetermined number of pulses of light have been emitted, sequentially reducing the gain of the variable-gain amplifiers.

13. A distance measurement device according to claim 11; wherein each integrating circuit comprises an amplifier, an input resistor, an integrating capacitor and a voltage follower.

14. A distance measurement device according to claim 9; wherein the light-receiving elements comprise SPDs arranged in a row.

15. A distance measurement device according to claim 9; wherein the light-receiving elements comprise SPDs arranged in a row, each having a width of 0.1 mm, a length of 0.8 mm, and wherein a space of 0.01 mm is provided between contiguous SPDs.

16. A distance measurement device according to claim 9; wherein the calculating means includes means for calculating an offset value by controlling the respective integrating circuits to integrate outputs of the respective adding circuits when no light is emitted by the light-emitting elements and using the offset value to correct a calculated distance value to compensate for inaccuracies inherent in circuit components of the distance measurement device.

17. A distance measuring apparatus for a camera, comprising: a plurality of light-emitting elements for projecting light onto an object to be photographed; a plurality of light-receiving elements for receiving light projected by the light-emitting elements and reflected by the object to be photographed and for converting the reflected light into an electrical signal; signal processing means for processing the electrical signal and producing a processed output signal; calculating means for counting the number of pulses of projected light and producing a corresponding count value; and control means for terminating light projection when the processed output signal exceeds a predetermined reference value or the count value exceeds a predetermined count value, and for effecting a distance measurement in accordance with the processed output signal and the count value when light projection is terminated; wherein the signal processing means includes an adding circuit for adding outputs of a selected plurality of contiguous light-receiving elements, and the calculating means includes means for performing a pre-measurement process for determining a combination of a single light-emitting element and a first group of light-receiving elements at which a result of the addition is maximized, setting a second group of light-receiving elements comprising the first group of light-receiving elements and one of a single or a plurality of the light-receiving elements contiguous to the first light-receiving element group, and dividing the second group of light-receiving elements into a plurality of subgroups, and for performing a distance measurement operation by measuring the distance to the object based on outputs from the respective divided subgroups.

18. A distance measuring apparatus for a camera according to claim 17; wherein the signal processing means further comprises an amplifying circuit for amplifying an output of the adding circuit, and the calculating means includes means for determining a single light-emitting element at which a maximum amplification gain is obtained.

19. A distance measuring apparatus for a camera according to claim 18; wherein the amplifying circuit comprises a two-stage amplifier circuit.

20. A distance measuring apparatus for a camera according to claim 19; wherein each stage of the two-stage amplifier circuit comprises a variable-gain amplifier having a feedback loop comprising a plurality of resistors and switches for selectively connecting respective resistors to the feedback loop.

21. A distance measuring apparatus for a camera according to claim 20; wherein the signal processing means further comprises an integrating circuit for integrating an output of the amplifier circuit, and the calculating means calculates a distance to the object based on an output of the integrating circuit.

22. A distance measuring apparatus for a camera according to claim 21; wherein the calculating means includes means for calculating an offset value by controlling the integrating circuit to integrate outputs of the respective adding circuits when no light is emitted by the light-emitting elements and using the offset value to correct a calculated distance value to compensate for inaccuracies inherent in circuit components of the distance measurement device.

23. A distance measuring apparatus for a camera according to claim 21; wherein the calculating means includes means for performing a gain-setting procedure comprising the steps of controlling the respective light-emitting elements to emit a predetermined number of pulses of light, controlling the adding circuit to add outputs of selected ones of the light-receiving elements until an output of the integrating circuit reaches a predetermined value, and, if the output of the integrating circuit exceeds the predetermined value before the predetermined number of pulses of light have been emitted, sequentially reducing the gain of the variable-gain amplifiers.

24. A distance measuring apparatus for a camera according to claim 21; wherein the integrating circuit comprises an amplifier, an input resistor, an integrating capacitor and a voltage follower.

25. A distance measuring apparatus for a camera according to claim 17; wherein the light-receiving elements comprise SPDs arranged in a row.

26. A distance measuring apparatus for a camera according to claim 17; wherein the light-receiving elements comprise SPDs arranged in a row, each having a width of 0.1 mm, a length of 0.8 mm, and wherein a space of 0.01 mm is provided between contiguous SPDs.

27. A distance measuring apparatus comprising: a plurality of light-emitting elements for projecting light onto an object; a plurality of light-receiving elements for receiving light projected by the light-emitting elements and reflected by the object and converting the reflected light into an electrical signal; signal processing means for processing the electrical signal and producing a processed output signal; and calculating means for calculating a distance to the object based on the processed output signal; wherein the calculating means includes means for performing a pre-measurement process for determining a combination of a single light-emitting element at which an output of the signal processing means is maximized and a first group of light-receiving elements at which an output of the signal processing means is maximized, setting a second group of light-receiving elements comprising the first group of light-receiving elements and one of a single or a plurality of the light-receiving elements contiguous to the first light-receiving element group, and dividing the second group of light-receiving elements into a plurality of subgroups, and for performing a distance measurement operation by measuring the distance to the object based on outputs from the respective divided subgroups.

28. A distance measuring apparatus according to claim 27; wherein the signal processing means includes an adding circuit for adding outputs of a selected plurality of contiguous light-receiving elements and an amplifying circuit for amplifying an output of the adding circuit, and the calculating means includes means for determining a single light-emitting element at which a maximum amplification gain is obtained.

29. A distance measuring apparatus according to claim 28; wherein the amplifying circuit comprises a two-stage amplifier circuit.

30. A distance measuring apparatus according to claim 29; wherein each stage of the two-stage amplifier circuit comprises a variable-gain amplifier having a feedback loop comprising a plurality of resistors and switches for selectively connecting respective resistors to the feedback loop.

31. A distance measuring apparatus according to claim 30; wherein the signal processing means further comprises an integrating circuit for integrating an output of the amplifier circuit, and the calculating means calculates a distance to the object based on an output of the integrating circuit.

32. A distance measuring apparatus according to claim 31; wherein the calculating means includes means for calculating an offset value by controlling the integrating circuit to integrate outputs of the respective adding circuits when no light is emitted by the light-emitting elements and using the offset value to correct a calculated distance value to compensate for inaccuracies inherent in circuit components of the distance measurement device.

33. A distance measuring apparatus according to claim 31; wherein the calculating means includes means for performing a gain-setting procedure comprising the steps of controlling the respective light-emitting elements to emit a predetermined number of pulses of light, controlling the adding circuit to add outputs of selected ones of the light-receiving elements until an output of the integrating circuit reaches a predetermined value, and, if the output of the integrating circuit exceeds the predetermined value before the predetermined number of pulses of light have been emitted, sequentially reducing the gain of the variable-gain amplifiers.

34. A distance measuring apparatus according to claim 31; wherein the integrating circuit comprises an amplifier, an input resistor, an integrating capacitor and a voltage follower.

35. A distance measuring apparatus according to claim 17; wherein the light-receiving elements comprise SPDs arranged in a row.

36. A distance measuring apparatus according to claim 27; wherein the light-receiving elements comprise SPDs arranged in a row, each having a width of 0.1 mm, a length of 0.8 mm, and wherein a space of 0.01 mm is provided between contiguous SPDs.

* * * * *